United States Patent
Gengler et al.

(10) Patent No.: US 6,442,501 B1
(45) Date of Patent: Aug. 27, 2002

(54) METHOD AND APPARATUS FOR CONTROLLING AN IMPLEMENT

(75) Inventors: Eric P. Gengler; Jeffrey M. Thate, both of Peoria, IL (US)

(73) Assignee: Agco Corporation, Duluth, GA (US)

( * ) Notice: Subject to any disclaimer, the term of this patent is extended or adjusted under 35 U.S.C. 154(b) by 0 days.

(21) Appl. No.: 09/409,276

(22) Filed: Sep. 30, 1999

(51) Int. Cl.$^7$ ................................................. G01P 5/00
(52) U.S. Cl. ................................. 702/142; 172/7; 172/8
(58) Field of Search ........................... 702/142; 172/10, 172/3, 7, 8, 2; 701/50

(56) References Cited

U.S. PATENT DOCUMENTS

| | | | |
|---|---|---|---|
| 4,132,273 A | * 1/1979 | Mortonson et al. | 172/2 |
| 4,268,057 A | 5/1981 | Engelmann et al. | 280/474 |
| 4,304,303 A | 12/1981 | Lange | 172/239 |
| 4,518,044 A | * 5/1985 | Wiegardt et al. | 172/7 |
| 4,645,226 A | 2/1987 | Gustavsson et al. | 280/423 A |
| 4,837,691 A | 6/1989 | Boe et al. | 364/424.05 |
| 4,852,657 A | 8/1989 | Hardy et al. | 172/2 |
| 4,979,092 A | 12/1990 | Bergene et al. | 364/148 |
| 5,012,415 A | 4/1991 | Boe et al. | 364/424.07 |
| 5,143,159 A | 9/1992 | Young et al. | 172/8 |
| 5,170,849 A | 12/1992 | Nikkel et al. | 172/6 |
| 5,320,186 A | * 6/1994 | Strosser et al. | 172/8 |
| 5,549,166 A | 8/1996 | Orbach et al. | 172/4 |
| 5,697,454 A | 12/1997 | Wilcox et al. | 172/447 |
| 5,823,270 A | 10/1998 | Cooper | 172/439 |

FOREIGN PATENT DOCUMENTS

| | | | | |
|---|---|---|---|---|
| DE | 19611626 A | 11/1997 | ........... | A01B/63/10 |

\* cited by examiner

*Primary Examiner*—Marc S. Hoff
*Assistant Examiner*—Mohamed Charioui
(74) *Attorney, Agent, or Firm*—Troutman Sanders LLP; Gerald R. Boss

(57) ABSTRACT

A method and apparatus for determining a velocity of an implement and thereby moving an implement to a desired position. A control system has input signals representative of the implement arm limit position, the implement arm actual position and the implement arm desired position and outputs a signal representative of a desired velocity. The control system determines an arm velocity as a function of the arm limit position and the arm actual position and a second velocity as a function of the arm actual position and the arm desired position. The desired velocity is a function of the arm velocity when the arm velocity has a predetermined relationship to the second velocity, and the desired velocity is a function of the second velocity when the arm velocity signal does not have the predetermined relationship to the second velocity.

25 Claims, 5 Drawing Sheets

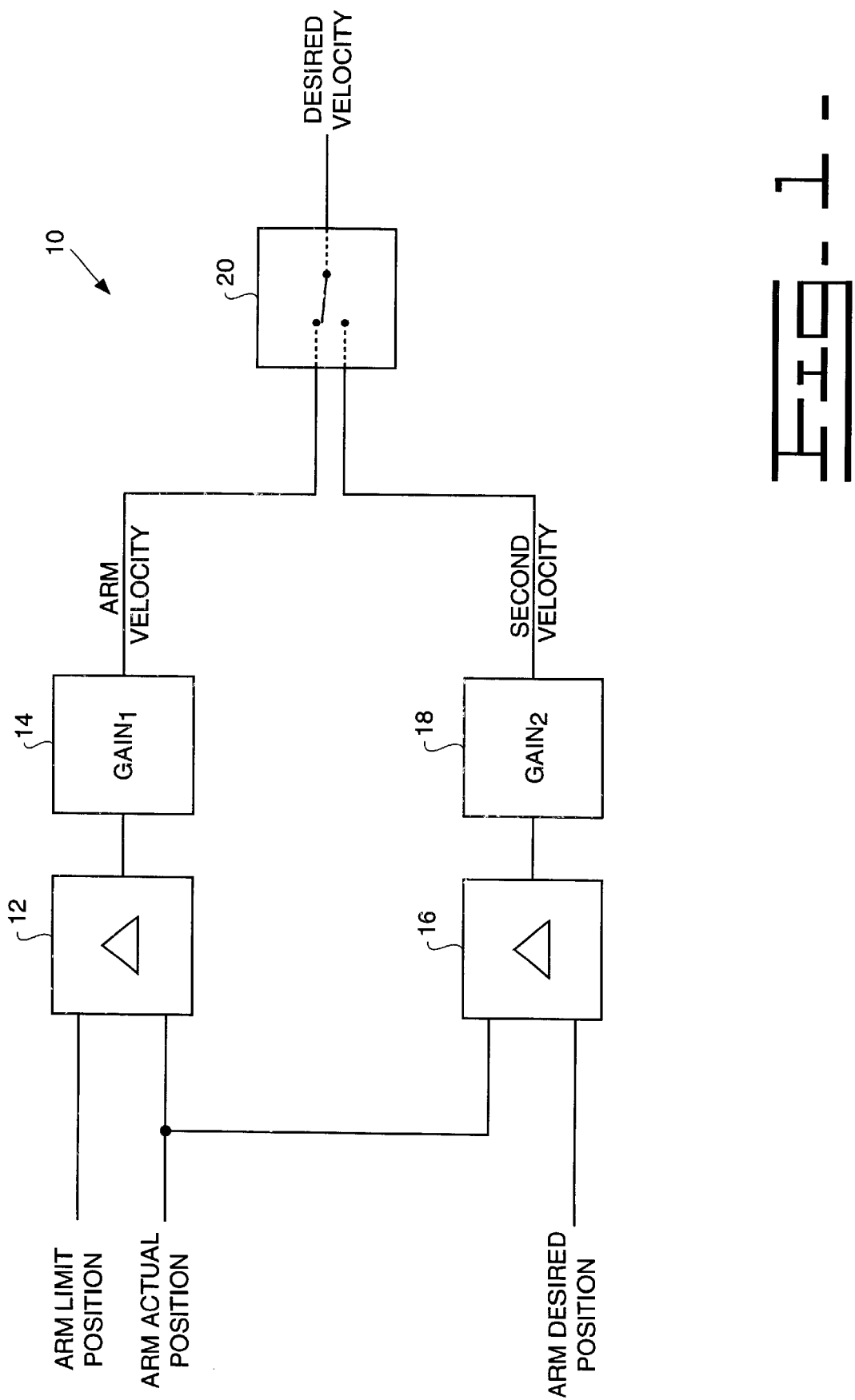

Fig_2
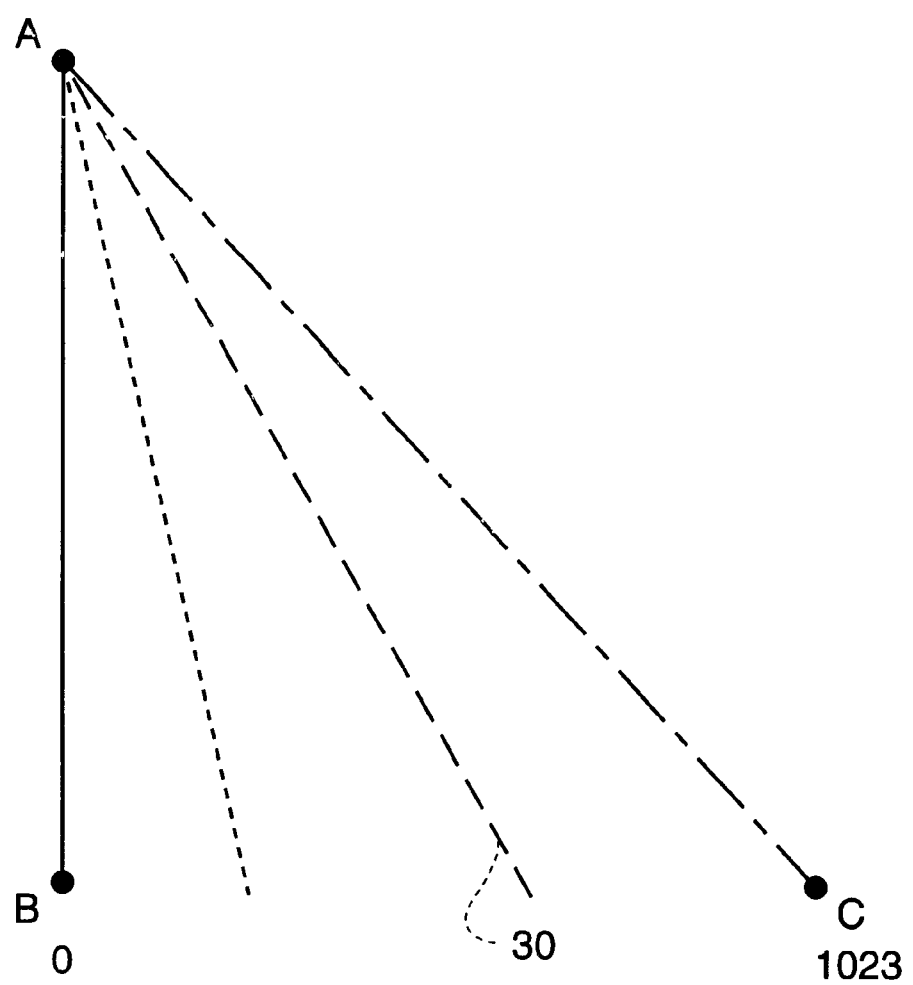

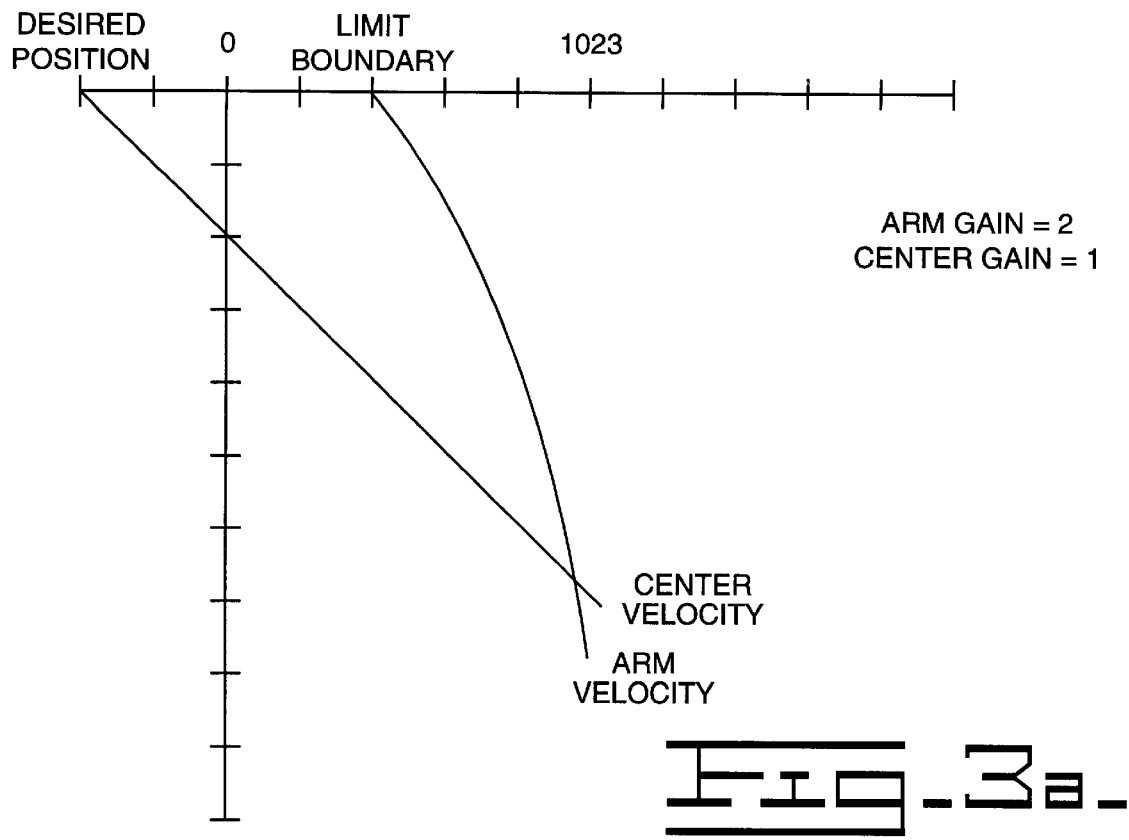
Fig-3a-
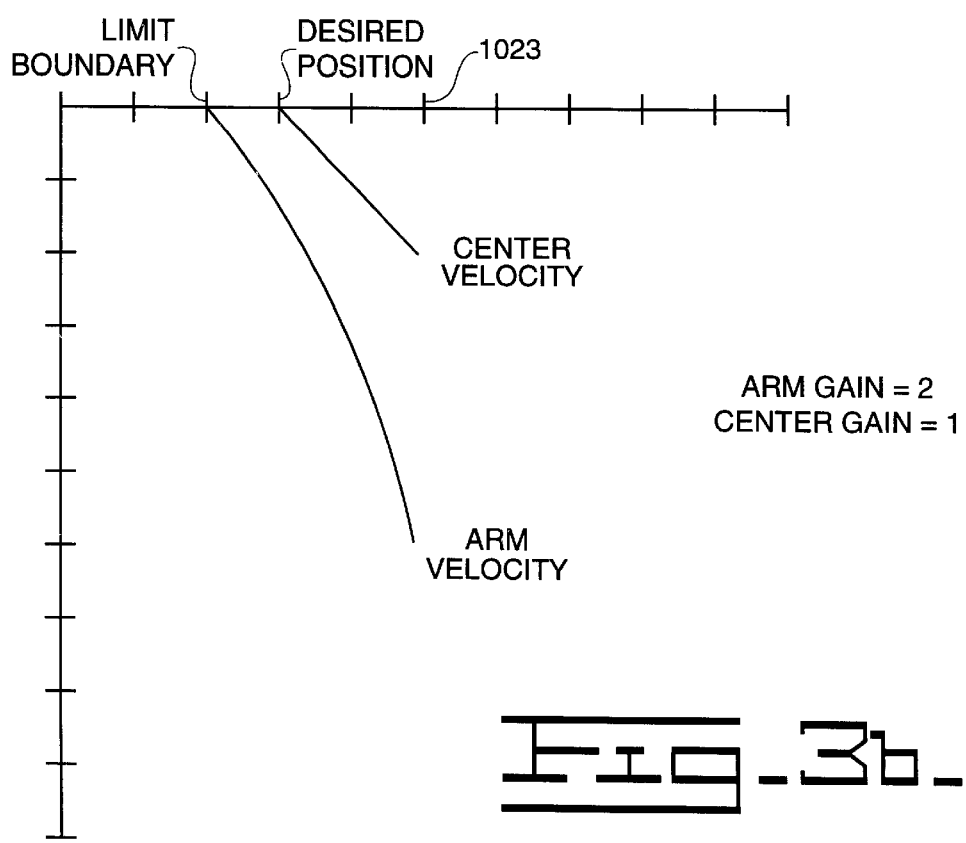
Fig-3b-

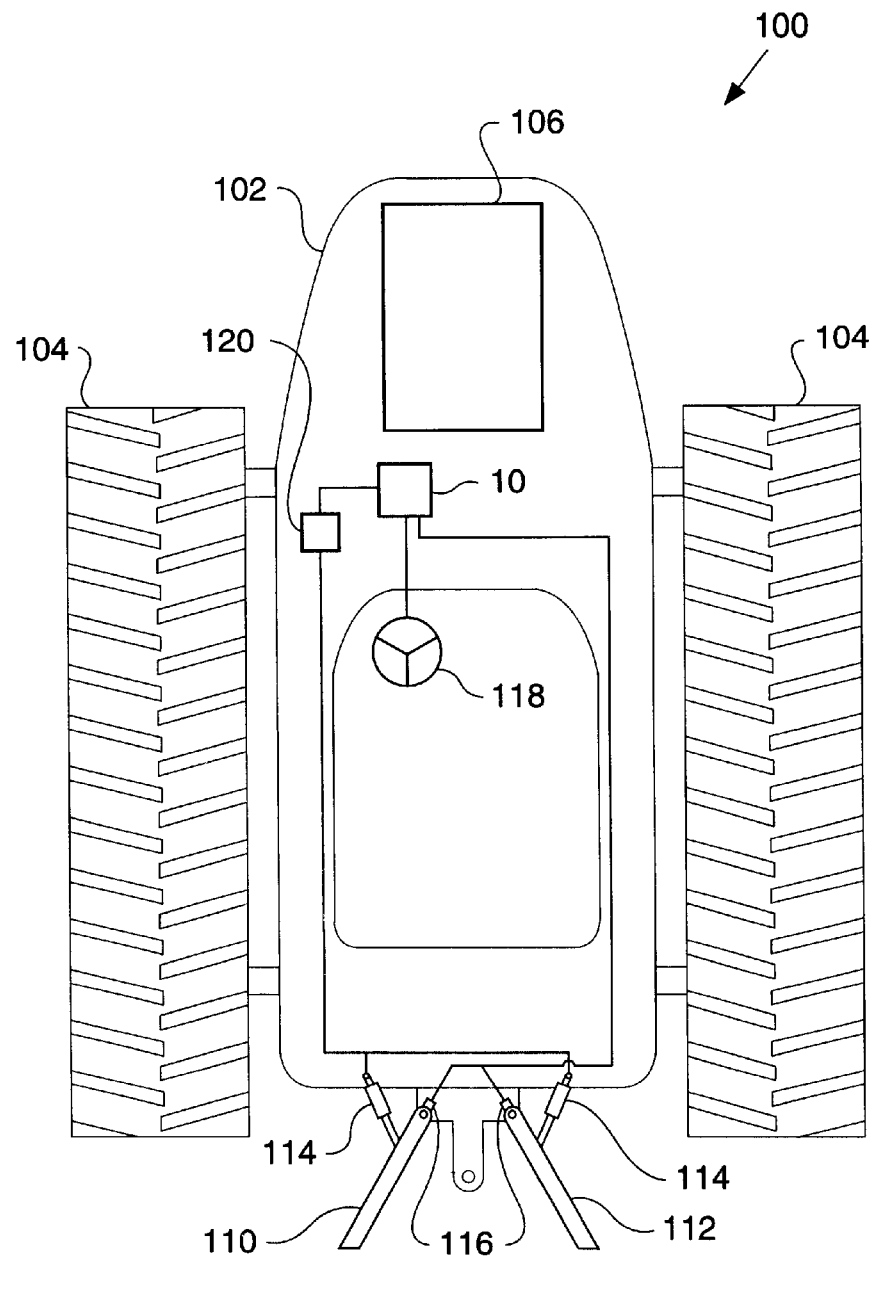
Fig_5_

METHOD AND APPARATUS FOR CONTROLLING AN IMPLEMENT

TECHNICAL FIELD

The present invention relates generally to the controlling of movement of an implement, and more specifically, for controlling the velocity of an implement.

BACKGROUND ART

Many conventional control systems use position control to control the movement of an implement. Thus, for a given input signal, the control system will move the implement to a discrete position, i.e., a 1:1 correspondence exists between the input and the position of the implement. Many input devices, such as joysticks, however, are used to provide relative movement commands. For example, deflecting a joystick 20 degrees to the left may indicate a desire to move the implement to the left a rate of 1 cm per second, while deflecting the joystick 40 degrees to the left indicates a desire to move the implement to the left at a rate of 5 cm per second. Thus, the input device provides a velocity, rather than position signal. In order to use this signal with position control, the velocity is integrated, providing a position signal that is input to the control system.

The use of integrators however, introduces several problems. For example, an operator may desire to move the arm of a hitch slightly to the left. Thus, the operator deflects the joystick slightly to the left. If the arm is physically prevented from moving, such as by an excessive load opposing the motion, the operator may continue to hold the joystick in the deflected position until seeing movement by the arm (e.g., after the load is removed). While the joystick is held in a deflected position, the integrator continues to integrate the commanded velocity. When the arm finally moves, the (position) output from the integrator may be large in magnitude, commanding the arm to move to a position much further to the left than intended by the operator (because the desired position is proportional to the magnitude of the output of the integrator). In addition, the integrator requires additional circuitry, increasing the complexity of the system and reducing its reliability.

Conventional control systems also typically respectively compare a single desired position or velocity with the actual position or velocity, producing an error signal corresponding to the difference. Thus, any adjustment to either the desired position signal or actual position signal affects the error signal, thereby affecting the entire control system. Thus the control system has uniform characteristics throughout, and the conventional control system cannot vary its performance, such as being more or less responsive to the input when the implement being controlled is in a predetermined position.

DISCLOSURE OF THE INVENTION

The present invention provides apparatus and methods for determining a velocity of an implement. A first processing device receives a first arm limit position signal and a first arm actual position signal. The first processing device determines a difference between the first arm limit position signal and the first arm actual position signal, and transmits a first arm position error signal as a function of the difference. A second processing device receives the first arm position error signal transmits a first arm velocity signal as a function of the first arm position error signal multiplied by a first predetermined function. A third processing device receives a first arm desired position signal and the first arm actual position signal. The third processing device determines a difference between the first arm desired position signal and the first arm actual position signal, and transmits a second position error signal as a function of the difference. A fourth processing device receives the second position error signal and transmit a second velocity signal as a function of the second position error signal multiplied by a second predetermined function. A fifth processing device receives the first arm velocity signal and the second velocity signal. The fourth processing device transmits a desired velocity signal as a function of the first arm velocity signal when the first arm velocity signal has a predetermined relationship to the second velocity signal, and transmits a desired velocity signal as a function of the second velocity signal when the first arm velocity signal does not have the predetermined relationship to the second velocity signal.

BRIEF DESCRIPTION OF THE DRAWINGS

FIG. 1 is a functional block diagram of an apparatus 10 for determining a velocity of an implement, such as an arm, according to one embodiment of the invention.

FIG. 2 is a top view of an arm controlled by the velocity-selecting device of FIG. 1.

FIGS. 3a and 3b are graphs of arm and center velocities versus actual position for a velocity-selecting device according to one embodiment of the invention.

FIG. 5 is a top view and functional block diagram of a work machine according to one embodiment of the invention.

BEST MODE FOR CARRYING OUT THE INVENTION

Figure 4:
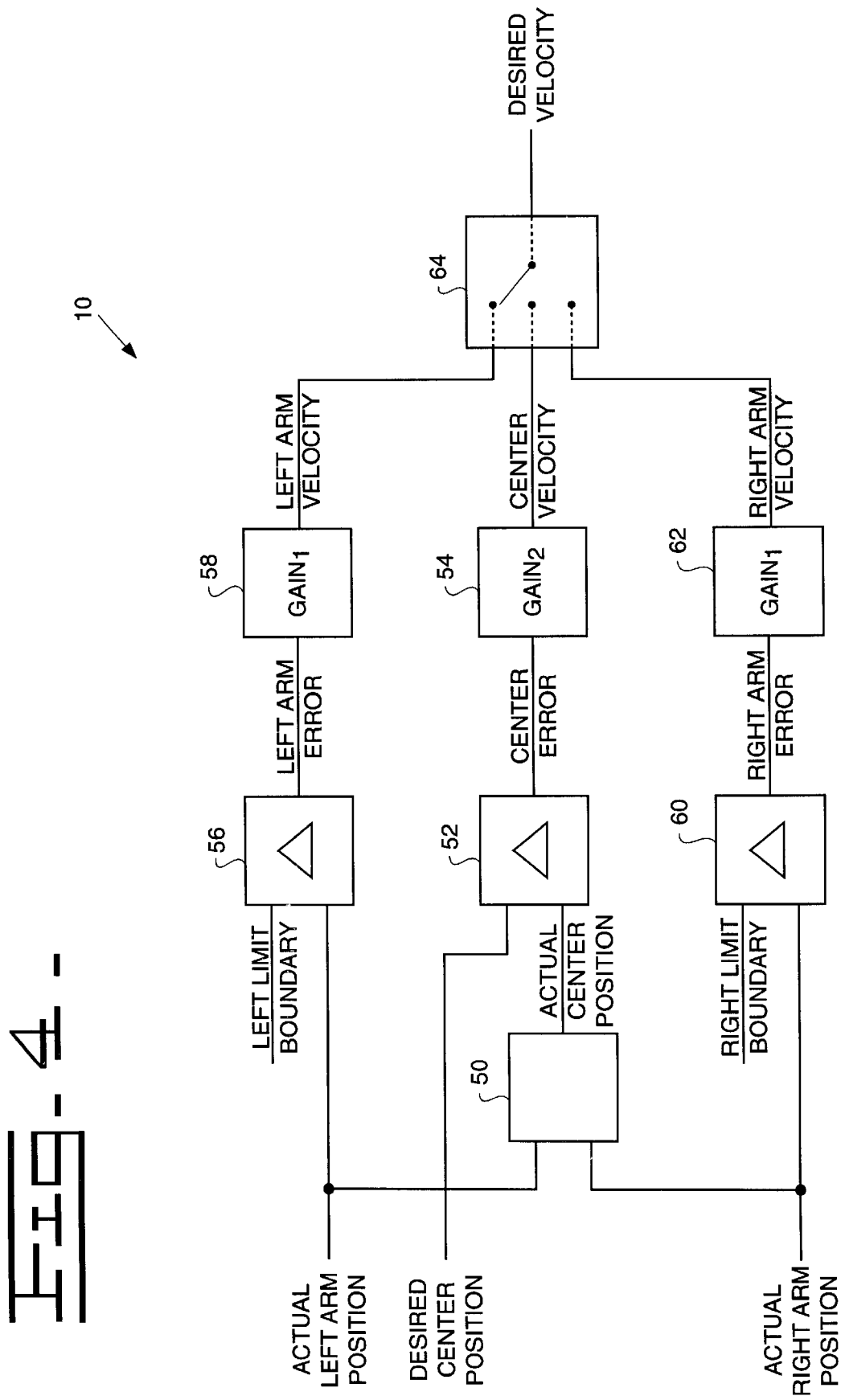
FIG. 4 is a functional block diagram of the velocity-selecting device for controlling multiple arms according to one embodiment of the invention.

FIG. 1 is a functional block diagram of an apparatus 10 for determining a velocity of an implement, such as an arm, according to one embodiment of the invention. A first processing device 12 receives an arm limit position signal and an arm actual position signal. The arm limit position signal is indicative of a boundary position beyond which movement by the arm is undesirable. The arm limit position signal may be predetermined, e.g., programmed in, or may be received from an external device, such as a memory. The arm actual position signal is indicative of an actual position of the arm.

The first processing device 12 determines and transmits a first arm position error signal that is a function of the arm limit position and the arm actual position. In a preferred embodiment, the first arm position error signal is a function of difference between the two signals. Typically the arm actual position is subtracted from the arm limit position, although the reverse may also be done.

A second processing device 14 is coupled with the first processing device 12 to receive the first arm position error signal. The second processing device 14 determines and transmits a first arm velocity signal as a function of the first arm position error signal multiplied by a first predetermined function $GAIN_1$, i.e., a first gain. Typically the first predetermined function is a first constant, although it need not be. In a preferred embodiment, the first constant is two.

A third processing device 16 receives a first arm desired position signal and the first arm actual position signal. The first arm desired position signal is indicative of a desired position of the arm. The third processing device 16 determines and transmits a second position error signal that is a function of the first arm desired position signal and the first arm actual position signal. In a preferred embodiment, the second position error signal is a function of difference between the two signals. Typically the arm actual position is subtracted from the desired position, although the reverse may also be done.

A fourth processing device 18 is coupled with the third processing device 16 to receive the second position error signal. The fourth processing device 18 determines and transmits a second velocity signal as a function of the first position error signal multiplied by a first predetermined function $GAIN_2$, i.e., a second gain. Typically the second predetermined function is a second constant, although it need not be. In a preferred embodiment, the second constant is one.

A fifth processing device 20 is coupled with the second and the fourth processing devices 14, 18 respectively to receive the first arm velocity signal and the second velocity signal. The fifth processing device 20 determines and transmits a desired velocity signal as a function of the first arm velocity signal and the second velocity signal.

In one embodiment, either or both of the second and fourth processing devices 14, 18 may be omitted, or signal carrier having a unity gain may be substituted in their place. For example, substituting a wire for either of the second and fourth processing devices 14 is equivalent to including a second or fourth processing device having a gain of one.

In one embodiment, the fifth processing device 20 uses the first arm velocity signal as the desired velocity signal when the first arm velocity is greater than the second velocity. The fifth processing device 20 uses the second velocity as the desired velocity when the first arm velocity is not greater than the second velocity. This embodiment is preferably used when the limit boundary for the arm is to the left of the arm.

For example, FIG. 2 is a top view of an arm 30 having a pivot point A. A line AB and a line AC define a desired operating range for movement of the arm 30. The positions of the arm 30 along a line (not shown) connecting points B and C are assigned values, such a 0 when the arm 30 is at point B, and 1,023 when the arm 30 is at point C. Further, defining a negative velocity as moving the arm 30 to the left (towards the limit boundary AB), while a positive velocity moves the arm 30 to the right (away from the limit boundary AB), and assuming the following conditions:

limit position=0
    actual position=800
    desired position=0
    $GAIN_1=2$
    $GAIN_2=1$
then:
    arm position error=0−800=−800
    second position error=0−800=−800
    arm velocity=−800*2=−1600
    second velocity=−800*1=−800
therefore:
    arm velocity is not greater than second velocity, and therefore the desired velocity equals the second velocity of −800, and the arm 30 is commanded to move to the left (because the velocity is negative) at the rate of 800.

However, if the arm should move beyond the limit boundary, such as when:

limit position=0
    actual position=−5
    desired position=0
    $GAIN_1=2$
    $GAIN_2=1$
then:
    arm position error=0−(−5)=5
    second position error=0−(−5)=5
    arm velocity=5*2=10
    second velocity=5*1=5
therefore:
    arm velocity is greater than second velocity, and therefore the desired velocity equals the arm velocity of 10, and the arm 30 is commanded to move to the right (because the velocity is positive) at the rate of 10.

Generally, the desired velocity will be the second velocity when the arm 30 is within the desired operating range (between points B and C), and will be the arm velocity only when the desired position of the arm 30 is outside (to the left) of the desired operating range, and within some distance of the limit boundary. As seen from the description and formulas above, the second velocity, if used exclusively, would drive the arm 30 to the desired position regardless of the location of the limit boundary. In contrast, the arm velocity will drive the arm 30 to the limit boundary, and stop it there.

However, when the desired position is within the desired operating range (between points B and C), the arm velocity, if used exclusively, will drive the arm 30 beyond the desired position to the limit boundary. Further, using the logic described above for the arm (desired) velocity, the arm velocity approaches zero as the arm approaches the desired position/limit boundary (whichever is encountered first). Thus, the arm 30 comes to a stop smoothly at the desired position/limit boundary.

When the desired position is greater than the limit position (i.e., further to the right, as shown in FIG. 3a) (between points B and C), the second velocity will be used exclusively. Thus the arm 30 will stop smoothly at the desired position. When the desired position is less than the limit position (i.e., further to the left, as shown in FIG. 3b), the second velocity will be used when the arm 30 is a relatively far distance from the limit boundary, and arm velocity will be used when arm 30 is a relatively shorter distance from the limit boundary. As discussed below, adjusting the gains $GAIN_1$, $GAIN_2$ of the center and arm velocities will change the distance from the limit boundary at which the arm velocity is used.

Increasing the magnitude of the gain $GAIN_1$ of the arm may improve the performance of the apparatus 10. By boosting (making more negative) the magnitude of the gain $GAIN_1$ of the arm, the magnitude of the arm velocity is increased (i.e., made more negative). Thus, the second velocity will be greater (i.e., less negative) than the arm velocity until the arm 30 is closer to the limit boundary than when the gain $GAIN_1$ is lower. However, once used, the boosted arm velocity will generally be greater in magnitude than if not boosted, thereby decreasing the response time of the system (i.e., increasing the responsiveness of the arm 30), and preventing large deviations over the limit boundary/desired position. Boosting the arm velocity however, generally increases the settling time, and increases the likelihood of electrical noise affecting the apparatus 10. As mentioned above, in a preferred embodiment, the arm gain $GAIN_1$ is equal to two.

Increasing the magnitude of the gain $GAIN_2$ of the second position error will generally cause the apparatus 10 to use the arm velocity until the arm 30 is close to the desired position/limit boundary (whichever is encountered first). This however, will usually cause an abrupt transition between the arm velocity and second velocity, causing the arm 30 to jerk. As mentioned above, in a preferred embodiment, the second gain $GAIN_2$ is equal to one.

In another embodiment, the fifth processing device 20 uses the first arm velocity signal as the desired velocity signal when the first arm velocity is less than the second velocity. This embodiment is preferably used when the limit boundary is to the right of the arm 30. The apparatus 10 functions similarly to what is described above, except the signs will generally be reversed.

FIG. 4 is a functional block diagram of an apparatus 10 for controlling two arms (typically a left and a right, not shown) according to one embodiment of the invention. Typically the arms pivot about a predetermined point, although lateral movement, e.g., translation, is also possible. Similarly to the embodiments described above, a desired operating range for the left and right arms is typically defined as 0 when the arm is fully to the left, and 1,023 when the arm is fully to the right. Both the left and right arms are typically assumed to be in the same location within the desired operating range, i.e., they are symmetrical. Further, the limit boundary for the left arm is typically assumed to be to the right of the left arm, while the limit boundary for the right arm is typically assumed to be to the left of the right arm.

A first processing device 50 is coupled with the left and right arms to receive a left arm actual position and an right arm actual position. The actual positions may be determined by any of a variety of appropriate sensors known to those skilled and the art. The first processing device 50 determines and transmits a center actual position as a function of the left and right arm actual positions. Typically the left and right arm actual positions are averaged, since the left and right arms are symmetrical as described above.

A second processing device 52 is coupled with the first processing device 50 to receive the center actual position. The second processing device 50 also receives a center desired position, typically from an external input device, such as a joystick or steering wheel (not shown). The second processing device 52 determines and transmits a center position error as a function of the center desired position and the center actual position. Typically in the center actual position is subtracted from the center desired position.

In one embodiment, the third processing device 54 is coupled with the second processing device 52 to receive the center position error. The third processing device 54 determines and transmits a center velocity as a function of the center position error and a predetermined function, such as a gain $GAIN_2$. In a preferred embodiment, the gain $GAIN_2$ is one.

A fourth processing device 56 receives the left arm actual position and a predetermined left limit boundary. The fourth processing device 56 determines and transmits a left arm position error as a function of the left arm actual position and the left arm limit boundary. Typically the left arm position error equals the left arm limit boundary minus the left arm actual position.

In one embodiment, a fifth processing device 58 is coupled with the fourth processing device 56 to receive the left arm position error. The fifth processing device 58 determines and transmits a left arm velocity as a function of the left arm position error and a predetermined function such as a gain $GAIN_1$. In a preferred embodiment the gain $GAIN_1$ is two.

A sixth processing device 60 receives the right arm actual position and a predetermined right limit boundary. The sixth processing device 60 determines and transmits a right arm position error as a function of the right arm actual position and the right arm limit boundary. Typically the right arm position error equals the right arm limit boundary minus the right arm actual position.

In one embodiment, a seventh processing device 62 is coupled with the sixth processing device 60 to receive the right arm position error. The seventh processing device 60 determines and transmits a right arm velocity as a function of the right arm position error and a predetermined function, such as the gain $GAIN_1$. Generally the gain for the right arm should equal the gain for the left arm to maintain symmetry.

An eighth processing device 64 is coupled with the fifth processing device 58 to receive the left arm velocity, with the third processing device 54 to receive the center velocity, and with the seventh processing device 62 to receive the right arm velocity. In the embodiment where the fifth, third, and seventh processing device is 58, 54, 62 are not present, the eighth processing device 64 may be coupled directly with the second, fourth, and sixth processing devices 52, 56, 60. The eighth processing device 64 determines and transmits a desired velocity as a function of the left arm velocity, the center velocity and the right arm velocity. Typically, the desired velocity will comprise the right arm velocity when the right arm velocity is greater than the center velocity, will comprise the left arm velocity when the left arm velocity is less than the center velocity, and otherwise will comprise the center velocity.

In another embodiment, where only one of the left and right arm actual positions is available, the available arm actual position is used for both the left arm actual position and right arm actual position. In a single sensor embodiment, the single arm position can be used for both arm positions. This requires that the arm that does not have a sensor attached to it to have its limit boundary altered so that the limit boundary correlates with the position of the other arm. For instance, if only a left arm sensor is being used, both the left arm and right arm positions will be assigned to the left arm position sensor. Thus, the right arm limit for this arrangement must be different than the right arm limit if two sensors were being used because now the right arm position is determined by the left arm position and is not a direct measurement of the right arm position. Because the right arm position is now assumed to have a fixed relationship to the left arm position, any time the relationship changes (e.g. a change in width between the lower draft arms of the 3-point hitch) the right arm limit must be altered accordingly.

As indicated above, in some embodiments, the third, fifth and/or seventh processing devices 54, 58, 62 may be omitted, or signal carrier having a unity gain may be substituted in their place. For example, respectively substituting a wire for either of the third, fifth, and seventh processing devices 54, 58, 62 is equivalent to respectively including a third, fifth, and seventh processing devices 54, 58, 62 having a gain of one.

Although the embodiments above generally describe processing devices, e.g., hardware, the invention may also be incorporated into software or a mixture of hardware and software by ways known to those skilled in the art. For example, in one embodiment of the invention, software code would be as follows:

Center position error=Center desired position–center actual position

Left arm position error=Left arm limit position–Left arm actual position

Right arm position error=Right arm limit position–Right arm actual position

Center velocity=Center position error*center gain

Left arm velocity=Left arm position error*left arm gain

Right arm velocity=Right arm position error*right arm gain

If (Right arm velocity>Center velocity) then

Desired velocity=Right arm velocity;

Else if (Left arm velocity<Center velocity) then

Desired velocity=Left arm velocity;

Else Desired velocity =Center velocity.

In addition, although shown as discrete portions, each of the processing devices may be combined with other processing devices, or multiple functions of a single processing device may be performed by separate processing devices.

FIG. 5 is a top view and functional block diagram of a work machine 100, such as a tractor, according to one embodiment of the invention. The work machine 100 includes a frame 102, and a ground engaging traction device, such as a wheel or endless belt, e.g., a track 104, coupled with the frame 102. An engine 106 is coupled with the frame 102, and with the tracks 104. The engine 106 provides a locomotive force to the tracks 104 by ways known to those skilled in the art.

A hitch assembly 108 including a moveable left arm 110 and a moveable right arm 112 is coupled with the frame 102. Typically the left and right arms pivot around respective predetermined points, although lateral movement, e.g., translation, may also be possible. A cylinder 114 is coupled with each of the left and right arms 110, 112 to cause the arms 110, 112 to pivot by ways known to those skilled in the art. Position sensors 116 are coupled with the left and right arms 110, 112 and transmit respective actual left arm and actual right arm positions by ways known to those skilled in the art. Again, a single arm sensor may be used in one embodiment, as described above.

A control input device, such as a joystick (not shown) or steering wheel 118 is coupled with the frame 102. The steering wheel 118 receives an input from an operator (not shown) and transmits a desired center position as a function of the input. The apparatus 10 of FIG. 4 is coupled with the steering wheel 118 to receive the desired center position, and with the position sensors 116 to receive the actual left and right arm positions. The apparatus 10 functions similarly to what is described above, and will not be repeated.

An actuating device 120, such as a hydraulic pump or electric motor, is coupled with the apparatus 10 to receive the desired velocity. The actuating device 120 is also coupled with the cylinders 114, and controls their respective velocities as a function of the desired velocity by ways known to those skilled in the art.

In another embodiment, the work machine 100 includes only a single position sensor 116 and a single cylinder 114. The left and right arms 110, 112 are typically rigidly coupled together by ways known to those skilled in the art. The work machine 100 functions similarly to the single sensor embodiment described above, and will not be repeated.

In operation, the use of only a single sensor may require recalibration of the center position when the left and right arms are shifted equally towards or away from each other, such as by changing the width of a point of attachment of an implement attached to the arms. The two sensor embodiments, however, automatically recalibrate the center position by averaging the left and right arm actual position signals.

An operator may control the position and offset of the hitch assembly 108, thereby controlling the position of a work implement (not shown) attached to the hitch assembly 108. Significantly, by transmitting a desired center position as a function of the steering wheel position, the invention allows for automatic offsetting of the hitch assembly 108 when the work machine 100 turns. When a work implement coupled with a hitch assembly 108 provides a dragging force, such as a plow in the earth, appropriately offsetting the hitch assembly 108 will cause the dragging force to assist in turning the work machine 100. For example, when the work machine 100 makes a left turn, the hitch assembly 108 is offset to the left of the centerline of the work machine 100. The drag from the work implement exerts a counter clockwise torque (when viewed from above) on the work machine 100, thereby assisting in causing the work machine 100 to turn left. Similarly, when the work machine 100 makes a right turn, the hitch assembly 108 is offset to the right of the centerline. Significantly, the offset of the hitch assembly 108 may be accomplished automatically by reading the position of the steering wheel.

The hitch assembly may also be manually controlled by overriding the desired center position signal from the steering wheel by ways known to those skilled in the art. For example, a joystick could instead be used. This allows for offsetting the hitch assembly while the work machine 100 is travelling in a straight line.

The apparatus 10 described above typically provide several advantages over conventional position-control systems. First, the apparatus 10 uses competing velocity control loops. In the one sensor embodiment (e.g., FIG. 1), two competing loops are typically used (arm velocity and center velocity), while in the two sensor embodiment (e.g., FIG. 4) three competing loops are typically used. The apparatus 10 has three velocities to chose from, as opposed to a conventional system's single velocity. Thus, the apparatus 10 has increased flexibility over conventional systems, and can perform more complex control of the arms.

Further, the use of three loops allows for each control loop to have a different level of aggressiveness and response. For example, as an arm approaches a limit boundary, it may be desirable for the arm to correct its position very quickly, while that level of aggressiveness for the arm is undesirable when far from the limit boundary. This may be achieved by increasing the gain of the arm velocity control loops as compared to the center velocity control loop. This option is only available because of the multiple velocities available to the velocity selector 10. Conventional control loops, having a single velocity gain factor, are limited to a single aggressiveness, and cannot achieve the variation possible with the velocity selector 10.

Second, because the apparatus 10 uses velocity control, it can interface with a joystick without the use of an integrator. This avoids the problems discussed above.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. An apparatus for determining a velocity of an implement, comprising:

a first processing device operable to receive a first arm limit position signal and a first arm actual position signal, the first processing device operable to determine a difference between the first arm limit position signal and the first arm actual position signal, and to transmit a first arm position error signal as a function of the difference;

a second processing device coupled with the first processing device to receive the first arm position error signal and to transmit a first arm velocity signal as a function of the first arm position error signal multiplied by a first predetermined function;

a third processing device operable to receive a first arm desired position signal and the first arm actual position signal, the third processing device operable to determine a difference between the first arm desired position signal and the first arm actual position signal, and to transmit a second position error signal as a function of the difference;

a fourth processing device coupled with the third processing device to receive the second position error signal and to transmit a second velocity signal as a function of the second position error signal multiplied by a second predetermined function; and a fifth processing device coupled with the second and fourth processing devices to respectively receive the first arm velocity signal and the second velocity signal, the fifth processing device operable to transmit a desired velocity signal as a function of the first arm velocity signal when the first arm velocity signal has a predetermined relationship to the second velocity signal, and operable to transmit a desired velocity signal as a function of the second velocity signal when the first arm velocity signal does not have the predetermined relationship to the second velocity signal.

2. The apparatus of claim 1 wherein the first predetermined function comprises a first constant.

3. The apparatus of claim 1 wherein the second predetermined function comprises a second constant.

4. The apparatus of claim 1 wherein the first velocity signal has the predetermined relationship to the second velocity when the first velocity is greater than the second velocity.

5. The apparatus of claim 1 wherein the first velocity signal has the predetermined relationship to the second velocity when the first velocity is less than the second velocity.

6. An apparatus for determining a velocity of a first and second implements, comprising:

a first processing device operable to receive a first arm limit position signal and a first arm actual position signal, the first processing device operable to determine a difference between the first arm limit position signal and the first arm actual position signal, and to transmit a first arm position error signal as a function of the difference;

a second processing device coupled with the first processing device to receive the first arm position error signal and to transmit a first arm velocity signal as a function of the first arm position error signal multiplied by a first predetermined function;

a third processing device operable to receive a second arm limit position signal and a second arm actual position signal, the third processing device operable to determine a difference between the second arm limit position signal and the second arm actual position signal, and to transmit a second arm position error signal as a function of the difference;

a fourth processing device coupled with the third processing device to receive the second arm position error signal and to transmit a second arm velocity signal as a function of the second arm position error signal multiplied by a second predetermined function;

a fifth processing device operable to receive a center desired position signal and a center actual position signal, the fifth processing device operable to determine a difference between the center desired position signal and the center actual position signal, and to transmit a center position error signal as a function of the difference;

a sixth processing device coupled with the fifth processing device to receive the center position error signal and to transmit a center velocity signal as a function of the center position error signal multiplied by a third predetermined function; and a seventh processing device coupled with the second, fourth, and sixth processing devices to respectively receive the first arm, second arm, and center velocity signals, the seventh processing device operable to transmit a desired velocity signal as a function of the first arm velocity signal when the first arm velocity signal has a predetermined relationship to the center velocity signal, to transmit a desired velocity signal as a function of the second arm velocity signal when the second arm velocity signal has a predetermined relationship to the center velocity signal, and operable to transmit a desired velocity signal as a function of the center velocity signal when the first arm velocity signal does not have the predetermined relationship to the center velocity signal and the second arm velocity signal does not have the predetermined relationship to the center velocity signal.

7. The apparatus of claim 6, further comprising an eighth processing section operable to receive the first and second actual arm position signals and to determine and transmit the center actual position signal to fifth processing device as a function of the first and second actual arm position signals.

8. The apparatus of claim 7 wherein the center actual position signal comprises the average of the first and second actual arm position signals.

9. The apparatus of claim 6 wherein the first predetermined function comprises a first constant.

10. The apparatus of claim 6 wherein the second predetermined function comprises a second constant.

11. The apparatus of claim 6 wherein the third predetermined function comprises a third constant.

12. The apparatus of claim 6 wherein the first arm velocity signal has the predetermined relationship to the center velocity signal when the first arm velocity signal is greater than the center velocity signal, and the second arm velocity signal has the predetermined relationship to the center velocity signal when the second arm velocity signal is less than the center arm velocity signal.

13. A work machine, comprising:

a frame;

an engine coupled with the frame and operable to provide a locomotive force;

a ground engaging traction device coupled with the frame and with the engine to receive the locomotive force, the ground engaging traction device operable to move relative to the frame as a function of the locomotive force;

a hitch assembly coupled with the frame and having a pivoting first and second arms;

a control input coupled with the frame, the control input providing a center desired position signal indicative of a desired position of the first and second arms;

a first sensor coupled with the first arm, the first sensor operable to transmit a first arm actual position signal as a function of the actual position of the first arm;

a second sensor coupled with the second arm, the second sensor operable to transmit a second arm actual position signal as a function of the actual position of the second arm;

a limit position transmitting device coupled with the frame and operable to transmit a first arm limit position signal and a second arm limit position signal indicative of respective limit boundaries of the first and second arms;

an apparatus for determining a velocity of the first and second arms, comprising:

a first processing device coupled with the limit position transmitting device to receive the first arm limit position signal and coupled with the first sensor to receive the first arm actual position signal, the first processing device operable to determine a difference between the first arm limit position signal and the first arm actual position signal, and to transmit a first arm position error signal as a function of the difference;

a second processing device coupled with the first processing device to receive the first arm position error signal and to transmit a first arm velocity signal as a function of the first arm position error signal multiplied by a first predetermined function;

a third processing device coupled with the limit position transmitting device to receive the second arm limit position signal and coupled with the second sensor to receive the second arm actual position signal, the third processing device operable to determine a difference between the second arm limit position signal and the second arm actual position signal, and to transmit a second arm position error signal as a function of the difference;

a fourth processing device coupled with the third processing device to receive the second arm position error signal and to transmit a second arm velocity signal as a function of the second arm position error signal multiplied by a second predetermined function;

a fifth processing device respectively coupled with the first and second sensors to receive the first and second arm actual position signals, and operable to transmit a center actual position as a function of the first and second arm actual position signals;

a sixth processing device coupled with the control input to receive the center desired position signal and with the fifth processing device to receive the center actual position signal, the sixth processing device operable to determine a difference between the center desired position signal and the center actual position signal, and to transmit a center position error signal as a function of the difference;

a seventh processing device coupled with the sixth processing device to receive the center position error signal and to transmit a center velocity signal as a function of the center position error signal multiplied by a third predetermined function; and an eighth processing device coupled with the second, fourth, and seventh processing devices to respectively receive the first arm, second arm, and center velocity signals, the eighth processing device operable to transmit a desired velocity signal as a function of the first arm velocity signal when the first arm velocity signal has a predetermined relationship to the center velocity signal, to transmit a desired velocity signal as a function of the second arm velocity signal when the second arm velocity signal has a predetermined relationship to the center velocity signal, and operable to transmit a desired velocity signal as a function of the center velocity signal when the first arm velocity signal does not have the predetermined relationship to the center velocity signal and the second arm velocity signal does not have the predetermined relationship to the center velocity signal; and an actuator coupled with the apparatus for determining a velocity of the first and second arms to receive the desired velocity signal and coupled with at least one of the first and second arms, the actuator operable to control the velocity of the at least one of the first and second arms as a function of the desired velocity signal.

14. The work machine of claim 13 wherein the control input comprises a steering wheel.

15. The work machine of claim 13 wherein the limit position transmitting device comprises one of a memory device and a second control input.

16. The work machine of claim 13 wherein the center actual position signal comprises the average of the first and second arm actual position signals.

17. A method for determining a velocity of an implement, comprising:

determining a first arm limit position;

determining a first arm actual position;

determining a first arm position error, the first arm position error comprising the difference between the first arm limit position and the first arm actual position;

determining a first arm desired position;

determining a second position error, the second position error comprising the difference between the first arm desired position and the first arm actual position;

determining a first arm velocity, the first arm velocity comprising the first arm position error multiplied by a predetermined first function;

determining a second velocity, the second velocity comprising the second position error multiplied by a predetermined second function; and determining a desired arm velocity as a function of one of the first arm velocity and the second velocity, the desired arm velocity comprising the first arm velocity when the first arm velocity has a predetermined relationship to the second velocity, and the desired arm velocity comprising the second velocity when the first arm velocity does not have the predetermined relationship to the second velocity.

18. The method of claim 17 wherein the first arm velocity has the first predetermined relationship to the second velocity when the first arm velocity is greater than the second velocity.

19. The method of claim 17 wherein the first arm velocity has the first predetermined relationship to the second velocity when the first arm velocity is less than the second velocity.

20. The method of claim 17 wherein the first predetermined function comprises a first constant.

21. The method of claim 17 wherein the second predetermined function comprises a second constant.

22. A method for determining a velocity of an implement having a first arm and a second arm, comprising:

determining a first arm limit position;

determining a first arm actual position;

determining a first arm position error, the first arm position error being a function of the difference between the first arm limit position and the first arm actual position;

determining a first arm velocity, the first arm velocity being a function of the first arm position error;

determining a second arm limit position;

determining a second arm actual position;

determining a second arm position error, the second arm position error being a function of the difference between the second arm limit position and the second arm actual position;

determining a second arm velocity, the second arm velocity being a function of the second arm position error;

determining a center desired position;

determining a center actual position;

determining a center position error, the center position error being a function of the difference between the center desired position and the center actual position;

determining a center velocity, the center velocity being a function of the center position error;

determining a desired velocity, the desired velocity comprising the first arm velocity when the first arm velocity is greater than the center velocity, the desired velocity comprising the second arm velocity when the second arm velocity is less than the center velocity, and the desired velocity comprising the center velocity when the first arm velocity is not greater than the center velocity and the second arm velocity is not less than the center velocity.

23. The method of claim 22 wherein the first arm velocity comprises the first arm position error multiplied by a first constant.

24. The method of claim 22 wherein the second arm velocity comprises the second arm position error multiplied by a second constant.

25. The method of claim 22 wherein the center velocity comprises the center position error multiplied by a third constant.

* * * * *